United States Patent
Baba (10) Patent No.: US 10,996,317 B2
(45) Date of Patent: May 4, 2021

(54) OBJECT DETECTION APPARATUS AND OBJECT DETECTION METHOD

(71) Applicant: DENSO CORPORATION, Kariya (JP)

(72) Inventor: Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 385 days.

(21) Appl. No.: 15/758,183

(22) PCT Filed: Aug. 29, 2016

(86) PCT No.: PCT/JP2016/075207
§ 371 (c)(1),
(2) Date: Mar. 7, 2018

(87) PCT Pub. No.: WO2017/043358
PCT Pub. Date: Mar. 16, 2017

(65) Prior Publication Data
US 2018/0246187 A1    Aug. 30, 2018

(30) Foreign Application Priority Data

Sep. 9, 2015   (JP) .............................. JP2015-177901

(51) Int. Cl.
*G01S 7/41*         (2006.01)
*G06K 9/62*         (2006.01)
(Continued)

(52) U.S. Cl.
CPC .............. *G01S 7/415* (2013.01); *G01S 13/60* (2013.01); *G01S 13/867* (2013.01);
(Continued)

(58) Field of Classification Search
CPC .. G06K 9/00805; G06K 9/00791; G06K 9/46; G06K 9/78; G08G 1/166;
(Continued)

(56) References Cited

U.S. PATENT DOCUMENTS

2009/0135065 A1* 5/2009 Tsuchida ............... G01S 17/931
                                                                    342/454
2009/0201192 A1* 8/2009 Tokoro ................ B60R 21/0134
                                                                    342/70
(Continued)

FOREIGN PATENT DOCUMENTS

JP          11-016099 A      1/1999
JP        2012-243155 A    12/2012
(Continued)

*Primary Examiner* — Olumide Ajibade Akonai
(74) *Attorney, Agent, or Firm* — Maschoff Brennan (57) ABSTRACT

An object detection apparatus includes an object detecting unit, a temporary determination unit a speed acquiring unit, and a final determination unit. The object detecting unit detects a pedestrian or a two-wheeled vehicle as an object that is present in a periphery of an own vehicle by performing image processing on a captured image capturing an advancing direction of the own vehicle. The temporary determination unit temporarily determinates a type of the object detected by the object detecting unit by analyzing the captured image. The speed acquiring unit acquires a movement speed of the object using reflected waves of a carrier wave. The final determination unit finally determines the type of the object temporarily determined by the temporary determination unit using the movement speed acquired by the speed acquiring unit.

12 Claims, 5 Drawing Sheets

(51) Int. Cl.
*G01S 13/60* (2006.01)
*G01S 13/86* (2006.01)
*G01S 13/931* (2020.01)
*G06K 9/00* (2006.01)
*G06T 7/20* (2017.01)
*G08G 1/16* (2006.01)

(52) U.S. Cl.
CPC ........ *G01S 13/931* (2013.01); *G06K 9/00805* (2013.01); *G06K 9/6281* (2013.01); *G06T 7/20* (2013.01); *G08G 1/166* (2013.01); *G06T 2207/10044* (2013.01); *G06T 2207/30261* (2013.01)

(58) Field of Classification Search
CPC .......... G08G 1/16; G08G 1/165; G08G 1/163; G01S 13/867; G01S 13/931; G01S 2013/93271; G01S 13/58; G01S 13/92; G01S 17/931; G01S 2013/93185; G01S 7/415; B60W 2420/42; B60W 2420/52; B60W 10/18; B60T 2201/022; G06T 2207/10044; G06T 2207/30261; G06T 7/20

See application file for complete search history.

(56) References Cited

U.S. PATENT DOCUMENTS

| | | | | |
|---|---|---|---|---|
| 2012/0119894 | A1* | 5/2012 | Pandy | B60W 30/16 340/435 |
| 2012/0293357 | A1* | 11/2012 | Nishigaki | G06K 9/00805 342/52 |
| 2014/0350785 | A1* | 11/2014 | Tsuchida | B60W 30/085 701/36 |
| 2015/0063648 | A1* | 3/2015 | Minemura | G06K 9/6217 382/104 |
| 2015/0186736 | A1* | 7/2015 | Han | G06K 9/00362 382/103 |
| 2015/0217765 | A1* | 8/2015 | Tokoro | B60W 50/0205 701/1 |
| 2015/0346337 | A1* | 12/2015 | Jung | G01S 13/931 342/55 |
| 2016/0293010 | A1* | 10/2016 | Kamijo | G08G 1/166 |

FOREIGN PATENT DOCUMENTS

| | | |
|---|---|---|
| WO | 2011/114815 A1 | 9/2011 |
| WO | WO 2015-087730 | 6/2015 |

* cited by examiner

OBJECT DETECTION APPARATUS AND OBJECT DETECTION METHOD

CROSS-REFERENCE TO RELATED APPLICATIONS

The present application is based on and claims the benefit of priority from Japanese Patent Application No. 2015-177901, filed on Sep. 9, 2015, the descriptions of which are incorporated herein by reference.

TECHNICAL FIELD

The present disclosure relates to an object detection apparatus that detects an object that is present in a periphery of an own vehicle, and an object detection method.

BACKGROUND ART

Detection of an object that is present in the periphery of an own vehicle through image processing of a captured image capturing an advancing direction of the own vehicle, and identification of a type of the object through analysis of the captured image are performed. However, in cases in which the type of the object is identified through use of the captured image, the type of the object may be erroneously determined depending on a shape and the like of the object. Therefore, determination accuracy regarding the type of the object has been improved through modification of an analysis method for the captured image.

For example, PTL 1 describes improvement in detection accuracy regarding a laterally oriented two-wheeled vehicle including a rider. Specifically, in an image that shows a laterally oriented two-wheeled vehicle including a rider, a person is present in an upper portion of the image and the two-wheeled vehicle is present in a lower portion of the image. In addition, in the lower portion in which the two-wheeled vehicle is present, two wheels are present and left-right symmetry thereof is strong. Meanwhile, the upper portion in which the person is present has no left-right symmetry because the person may be at a forward-tilted attitude, or a hand or foot may be extended towards the advancing direction. Therefore, taking advantage of such characteristics, the image showing the laterally oriented two-wheeled vehicle is divided into upper and lower portions. Feature characteristics taking into consideration left-right symmetry are used only for the lower portion. As a result, identification accuracy regarding a laterally oriented two-wheeled vehicle is improved.

CITATION LIST

Patent Literature

[PTL 1] JP-A-2012-243155

SUMMARY OF INVENTION

However, in the case in PTL 1, correct identification as the laterally oriented two-wheeled vehicle including a rider may not be made when the left-right symmetry of the two-wheeled vehicle is not correctly extracted as a result of a portion of the two-wheeled vehicle being hidden by another object or the like. In addition, in the case of a two-wheeled vehicle that is traveling in a same traffic lane as the own vehicle, that is, in the case of a vertically oriented two-wheeled vehicle including a rider, the left-right symmetry of the two-wheeled vehicle cannot be detected. Therefore, the configuration in PTL 1 cannot be applied. Furthermore, in such cases, when the two-wheeled vehicle cannot be correctly detected, erroneous determination of a two-wheeled vehicle including a rider and a pedestrian may be made.

The main object of the present disclosure is to provide an object detection apparatus that is capable of determining with more accuracy a type of an object using a captured image, and an object detection method.

A first aspect of the present disclosure includes: an object detecting unit that detects a pedestrian or a two-wheeled vehicle as an object that is present in a periphery of an own vehicle by performing image processing on a captured image capturing an advancing direction of the own vehicle; a temporary determination unit that temporarily determines a type of the object detected by the object detecting unit by analyzing the captured image; a speed acquiring unit that acquires a movement speed of the object using reflected waves of a carrier wave; and a final determination unit that finally determines the type of the object temporarily determined by the temporary determination unit using the movement speed of the object acquired by the speed acquiring unit.

According to the first aspect of the present disclosure, compared to when the type of the object is identified through use of only the captured image, detection accuracy regarding the type of the object can be improved as a result of the type of the object being identified taking into consideration the movement speed of the object.

BRIEF DESCRIPTION OF DRAWINGS

The above-described object, other objects, characteristics, and advantages of the present disclosure will be clarified through the detailed description below, with reference to the accompanying drawings. In the drawings.

DESCRIPTION OF EMBODIMENTS

Each embodiment will hereinafter be described with reference to the drawings. Sections that are identical or equivalent to each other among the following embodiments are given the same reference numbers in the drawings. Descriptions of sections having the same reference numbers are applicable therebetween.

First Embodiment

An object detection apparatus 10 according to a present embodiment is mounted in a vehicle (own vehicle). The object detection apparatus 10 detects an object that is present ahead of the own vehicle. Information on the object detected by the object detection apparatus 10 is used in various types of vehicle control, such as collision avoidance e own vehicle. For example, the information is used in various types of vehicle control, such as a pre-crash safety system (PCS) and adaptive cruise control (ACC).

Figure 1:
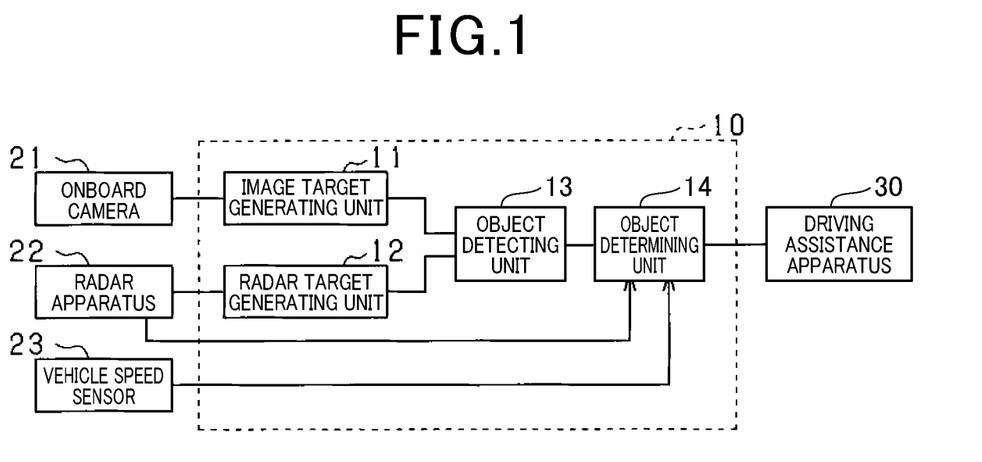
FIG. 1 is an overall configuration diagram of an object detection apparatus.

In FIG. 1, the object detection apparatus 10 is communicably connected to an onboard camera 21, a radar apparatus 22, a vehicle speed sensor 23, and a driving assistance apparatus 30.

The onboard camera 21 is composed of an image sensor. The onboard camera 21 captures an area that spreads over a predetermined range ahead of the own vehicle, at every predetermined amount of time, and acquires a captured image. The radar apparatus 22 transmits and receives electromagnetic waves that have directionality, such as millimeter waves or a laser beam. Then, the radar apparatus 22 acquires information, such as a distance to an object that has reflected the electromagnetic waves, orientation, and relative speed, as positional information of a target. The vehicle speed sensor 23 is provided in a rotation shaft that transmits power to a wheel of the own vehicle. The vehicle speed sensor 23 determines an own-vehicle speed that is a speed of the own vehicle based on a rotation speed of the rotation shall. The electromagnetic wave according to the present embodiment corresponds to a carrier wave.

The object detection apparatus 10 is configured by a central processing unit (CPU), a read-only memory (ROM), a random access memory (RAM), an input/output interface, and the like. The object detection apparatus 10 includes an image target generating unit 11, a radar target generating unit 12, an object detecting unit 13, and an object determining unit 14. Here, the image target generating unit 11 corresponds to an object detecting unit. The radar target generating unit 12 corresponds to a speed acquiring unit. The object determining unit 14 corresponds to a temporary determination unit and a final determination unit.

The image target generating unit 11 extracts, by image processing (pattern matching process), a target to be detected that is included in the captured image inputted from the onboard camera 21. Targets to be detected may include preceding vehicles, pedestrians, two-wheeled vehicles including a rider (referred to, hereafter, as two-wheeled vehicles), and other obstacles. The two-wheeled vehicle includes a bicycle and a motorcycle.

For example, the image target generating unit 11 calculates a degree of coincidence between image data (template) that indicates the target to be detected and is prepared in advance, and a predetermined area within the captured image. When the degree of coincidence is high, the image target generating unit 11 determines that the predetermined area is the target to be detected. Then, when the target is extracted, the image target generating unit 11 generates an image target GT that includes information such as a type of the target, a distance to the target, orientation and relative speed, and a lateral width of the target, and outputs the image target GT to the object detecting unit 13.

The radar target generating unit 12 generates a radar target LT using the positional information of the target inputted from the radar apparatus 22 and outputs the radar target LT to the object detecting unit 13.

The object detecting unit 13 determines whether the image target GT inputted from the image target generating unit 11 and the radar target LT inputted from the radar target generating unit 12 are generated from a same object. For example, a predetermined image search area is set in the captured image using the positional information of the target identified from the radar target LT. Then, when the image target GT is included in the image search area, a determination is made that the radar target LT and the image target GT are generated from the same object.

The driving assistance apparatus 30 includes, as onboard apparatuses, a speaker that outputs warning sounds and guidance sounds, a seatbelt, a brake, and the like. The driving assistance apparatus 30 determines whether or not driving assistance regarding the object detected by the object detection apparatus 10 is required. When determined that driving assistance is required, the driving assistance apparatus 30 operates the various onboard apparatuses.

For example, the driving assistance apparatus 30 calculates a time-to-collision (TTC) between the object and the own vehicle. The TTC is an evaluation value that indicates a number of seconds until collision with the object should traveling be continued at the own-vehicle speed. The risk of collision increases as the TTC decreases and the risk of collision decreases as the TTC increases. The TTC can be calculated by a method such as a distance in the advancing direction between the object and the own vehicle being divided by a relative speed to the object. The relative speed to the object is determined by the own-vehicle speed being subtracted from a vehicle speed of a preceding vehicle. The TTC may be calculated taking into consideration relative acceleration.

Then, when the TTC is equal to or less than an operation time of the onboard apparatus, the driving assistance apparatus 30 operates the relevant onboard apparatus. The operation time of each onboard apparatus is set depending on the type of the object. For example, between the operation time in the case in which the object is a pedestrian and the operation time in the case in which the object is a two-wheeled vehicle, the case in which the object is a two-wheeled vehicle is set to an earlier operation time.

Here, when an object is identified through image processing of a captured image, the type of the object may be erroneously determined. For example, a two-wheeled vehicle may be erroneously determined to be a pedestrian.

Figure 2:
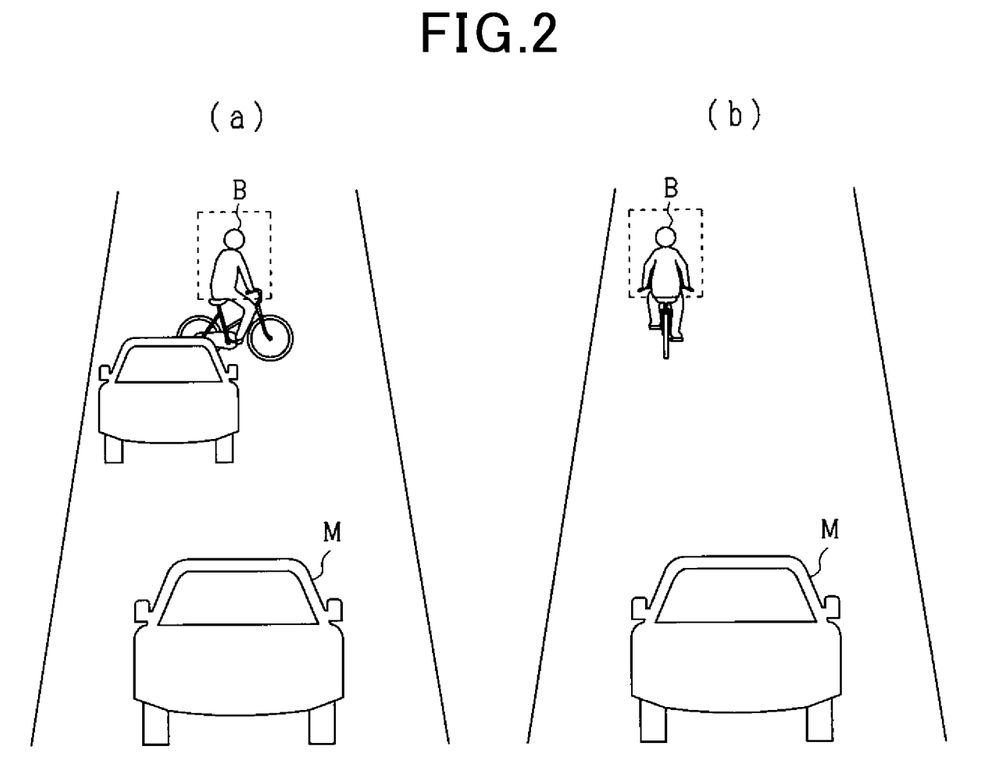
FIG. 2 is an explanatory diagram related to a two-wheeled vehicle including a rider.

That is, as shown in FIG. 2 by (a), when a two-wheeled vehicle B is traveling in a direction orthogonal to an advancing direction of an own vehicle M (laterally oriented), a situation in which a wheel portion of the two-wheeled vehicle is not correctly extracted by pattern matching may occur as a result of a portion of the wheel of the two-wheeled vehicle B being hidden by another object. When a portion of the two-wheeled vehicle is not correctly detected and only a rider portion on an upper side is detected, the object is erroneously determined to be a pedestrian rather than a two-wheeled vehicle.

In addition, as shown in FIG. 2 by (b), when a two-wheeled vehicle is traveling in a same direction as the advancing direction of the own vehicle (vertically oriented), in the first place, the wheel portion that is a feature of the two-wheeled vehicle is difficult to detect through image processing. Therefore, in this case as well, when the two-wheeled vehicle portion is not correctly detected by pattern matching and only the rider portion is detected, the object is erroneously determined to be a pedestrian rather than a two-wheeled vehicle.

Meanwhile movement speed V (such as ground speed) differs between a two-wheeled vehicle and a pedestrian. The movement speed V of a two-wheeled vehicle tends to be greater than the movement speed V of a pedestrian. Therefore, according to the present embodiment, focus is placed on this point. When the object detected by the object detecting unit 13 is a pedestrian, the object determining unit 14 determines whether or not the movement speed V of the object is greater than a predetermined first threshold Th1.

The movement speed V of an object is determined by a difference between a relative speed of the object determined from the radar target LT and the own-vehicle speed detected by the vehicle speed sensor 23. In addition, the first threshold Th1 is merely required to be set to a speed that enables differentiation of the movement speed V between the pedestrian and the two-wheeled vehicle. For example, the first threshold Th1 can be set from 10 km/h to 15 km/h.

Then, when the object detecting unit 13 detects a pedestrian as the object and the movement speed V of the object is greater than the first threshold Th1, the object determining unit 14 determines that the object is a two-wheeled vehicle. When the movement speed V of the object is less than the first threshold Th1, the object determining unit 14 determines that the object is a pedestrian. In this manner, when a pedestrian is detected as the object, the type of the object is determined again, taking into consideration the movement speed of the object. As a result, erroneous determination of a two-wheeled vehicle as a pedestrian can be suppressed.

Next, a determination process for the type of object according to the present embodiment will be described with reference to a flowchart in FIG. 3. The present process is repeatedly performed by the object detection apparatus 10 at a predetermined cycle.

Figure 3:
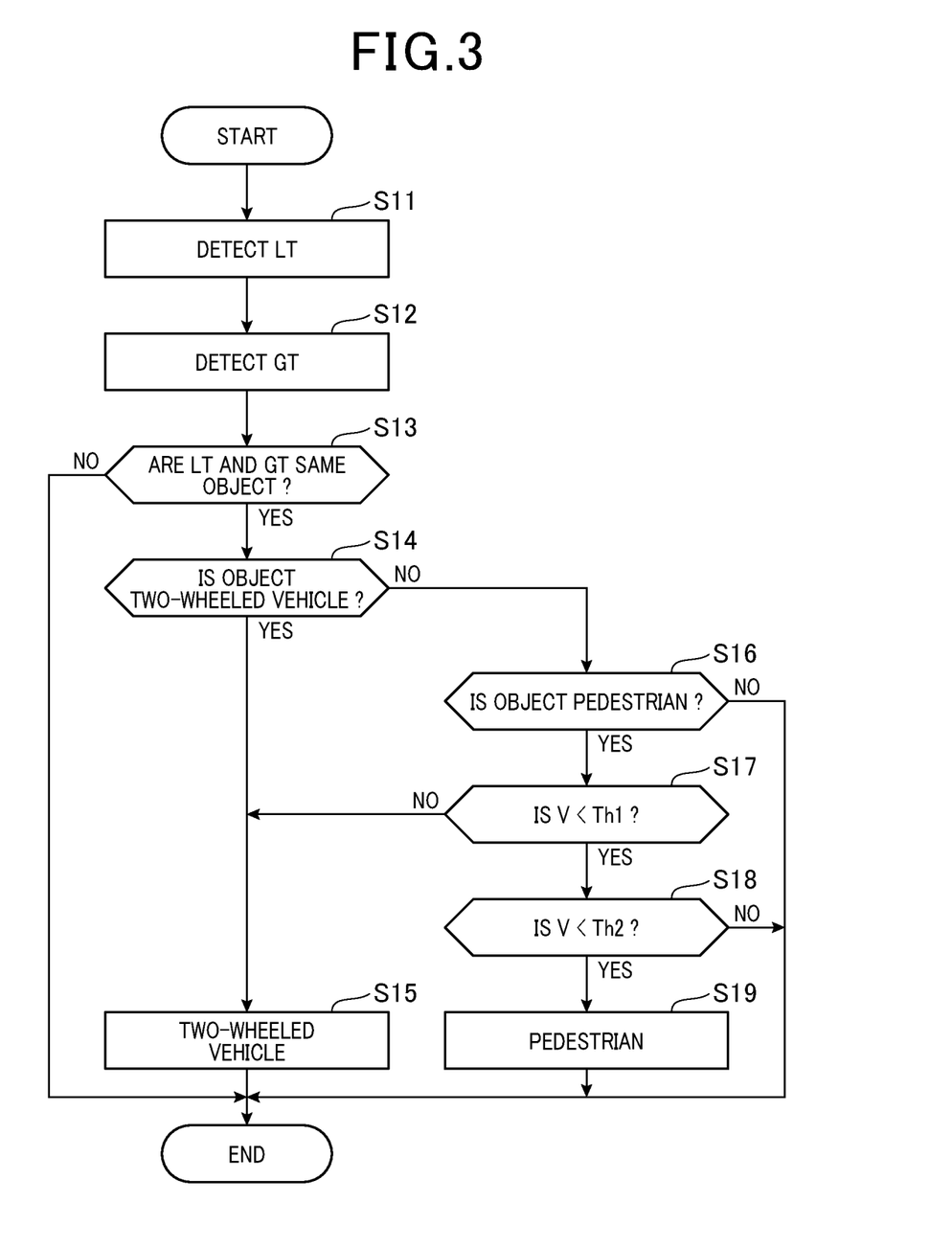
FIG. 3 is a flowchart of an object detection process.

In FIG. 3, first, the object detection apparatus 10 detects the radar target LT (step S11) and detects the image target GT (step S12). Next, the object detection apparatus 10 determines whether or not the radar target LT and the image target GT are the same object (step S13).

As a result, when an affirmative determination is made at step S13 (YES at step S13), the object detection apparatus 10 temporarily determines whether or not the type of the object is a two-wheeled vehicle (step S14). In the process at step S14, the determination is made based on the type of the object determined from the image target GT.

As a result, when an affirmative determination is made at step S14 (YES at S14), the object detection apparatus 10 determines that the object is a two-wheeled vehicle (step S15). Meanwhile, when a negative determination is made at step S14 (NO at step S14), that is, when the object recognized from the captured image is not a two-wheeled vehicle, the object detection apparatus 10 determines whether or not the type of the object is a pedestrian (step S16). As a result, when a temporary determination that the type of the object is a pedestrian is made at step S16 (YES at step S16), the object detection apparatus 10 determines whether or not the movement speed V of the object determined from the radar target LT is less than the first threshold Th1 (step S17).

As a result, when determined that the movement speed V of the object is greater than the threshold Th1 at step S17 (NO at step S17), the object detection apparatus 10 proceeds to step S15 and finally determines that the object is a two-wheeled vehicle. Meanwhile, when determined that the movement speed V of the object is less than the first threshold Th1 at step S17 (YES at step S17), the object detection apparatus 10 determines whether or not the movement speed V of the object is less than a second threshold Th2 (step S18). Here, the second threshold Th2 is set to a value that is less than the first threshold Th1.

As a result, when an affirmative determination is made at step S18 (YES at step S18), the object detection apparatus 10 finally determines that the type of the object is a pedestrian (step S19). When a negative determination is made at step S13, S16, or S18 (NO at step S13, NO at step S16, or NO at step S18), the present process is ended.

In FIG. 3, whether or not the object is a pedestrian is determined by the second threshold Th2 that is less than the first threshold Th1 and the movement speed V of the object being compared at step S18. However, the first threshold Th1 and the second threshold Th2 may be the same value. In this case, the process at S18 may be omitted.

According to the above-described embodiment, the following excellent effects can be achieved.

Compared to when the type of the object is identified through use of only a captured image, the determination accuracy regarding the type of the object can be improved as a result of the type of the object being identified taking into consideration the movement speed of the object.

The object is determined to be a two-wheeled vehicle under a condition that the object is determined to be a pedestrian and the movement speed is greater than the first threshold Th1. Therefore, erroneous determination of the two-wheeled vehicle as a pedestrian can be suppressed.

The object is determined to be a pedestrian under a condition that the object is determined to be a pedestrian and the movement speed is less than the second threshold Th2. Therefore, the determination accuracy regarding the object being a pedestrian can be improved.

In a state in which a two-wheeled vehicle is moving in the advancing direction of the own vehicle, that is, when the two-wheeled vehicle is traveling in a vertically oriented manner, extraction of the wheel portion that is a feature of the two-wheeled vehicle through image processing is difficult. Therefore, the likelihood of an erroneous determination of the two-wheeled vehicle as a pedestrian becomes high. At this time, as a result of the final determination of the type of the object being made through use of the movement speed of the object, the two-wheeled vehicle including a rider can be correctly determined even under circumstances in which extraction of the feature portion of the two-wheeled vehicle is difficult.

The above-described embodiment may be modified in the following manner. Configurations in the description below that are similar to the above-described configurations are given the same reference numbers. Detailed descriptions thereof are omitted.

Second Embodiment

A second embodiment will be described. As the two-wheeled vehicle, there are bicycles and motorcycles. The respective movement speeds V thereof differ. Taking this into consideration, according to the present embodiment, the movement speed V is compared to a plurality of thresholds, and a determination is made through differentiation among a pedestrian, a bicycle, and a motorcycle.

A process according to the present embodiment will be described below with reference to a flowchart shown in FIG. 4.

Figure 4:
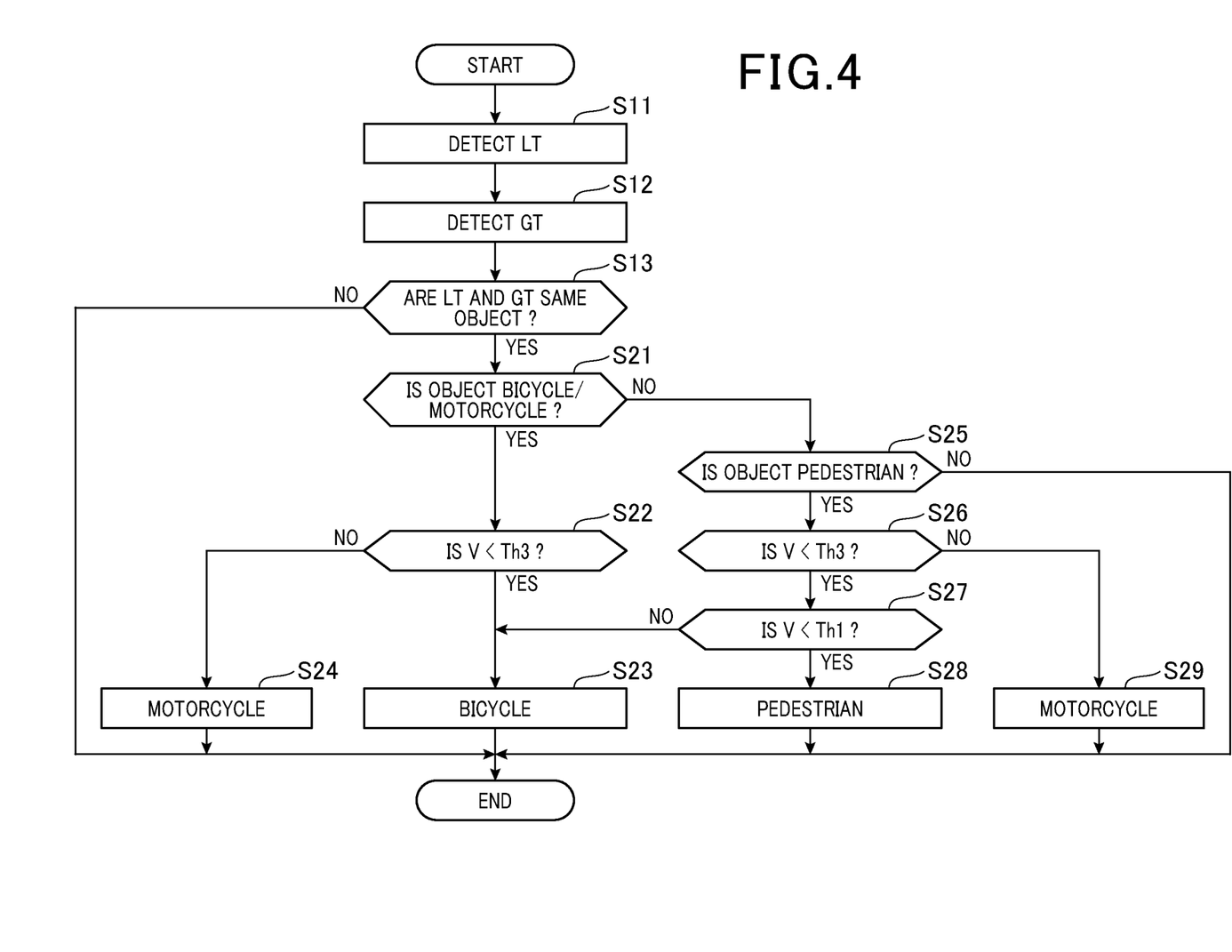
FIG. 4 is a flowchart of an object detection process according to a second embodiment.

In FIG. 4, when determined that the radar target LT and the image target GT are the same object at step S13 (YES at step S13), the object detection apparatus 10 determines whether or not the object is a bicycle or a motorcycle (step S21).

As a result, when determined that the object is a bicycle or a motorcycle (YES at step S21), the object detection apparatus 10 determines whether or not the movement speed of the object is less than a third threshold Th3 (step S22). The third threshold Th3 is a value that is greater than the first threshold Th1 and is set to a speed that enables differentiation between a motorcycle and a bicycle. For example, the third threshold Th3 can be set from 30 km/h to 40 km/h.

As a result, when determined that the movement speed of the object is less than the third threshold Th3 at step S22 (YES at step S22), the object detection apparatus 10 determines that the object is a bicycle (step S23). Meanwhile, when determined that the movement speed of the object is greater than the third threshold Th3 at step S22 (NO at step S22), the object detection apparatus 10 determines that the object is a motorcycle (step S24).

Meanwhile, when a negative determination is made at step S21 (NO at step S21), the object detection apparatus 10 determines whether or not the object is a pedestrian (step S25). As a result, when an affirmative determination is made at step S25 (YES at step S25), the object detection apparatus 10 determines whether or not the movement speed of the object is less than the third threshold Th3 (step S26).

As a result, when determined that the movement speed V of the object is greater than the third threshold Th3 at step S26 (NO at step S26), the object detection apparatus 10 finally determines that the object is a motorcycle rather than a pedestrian (step S29). Meanwhile, when determined at step S26 than the movement speed of the object is less than the third threshold Th3 (YES at step S26), the object detection apparatus 10 proceeds to step S27 and determines whether or not the movement speed V of the object is less than the first threshold Th1 (step S27).

As a result, when the movement speed V of the object is less than the first threshold Th1 (YES at step S27), the object detection apparatus 10 finally determines that the object is a pedestrian (step S28). Meanwhile, when the movement speed V of the object is greater than the first threshold Th1 (NO at step S27), the object detection apparatus 10 proceeds to step S23 and finally determines that the object is a bicycle (step S23).

As described above, according to the present embodiment, as a result of the difference in movement speed among the pedestrian, the bicycle, and the motorcycle being taken into consideration, a determination can be made through differentiation regarding whether the object is a pedestrian, a bicycle, or a motorcycle.

Third Embodiment

A third embodiment will be described. In the image processing of the captured image, a pedestrian may be erroneously determined to be a two-wheeled vehicle. As a countermeasure therefor, according to the present embodiment, a final determination regarding whether or not the object is a two-wheeled vehicle is made through use of the movement speed V, even in cases in which a temporary determination of a two-wheeled vehicle is made.

A process according to the present embodiment will be described below with reference to a flowchart in FIG. 5.

Figure 5:
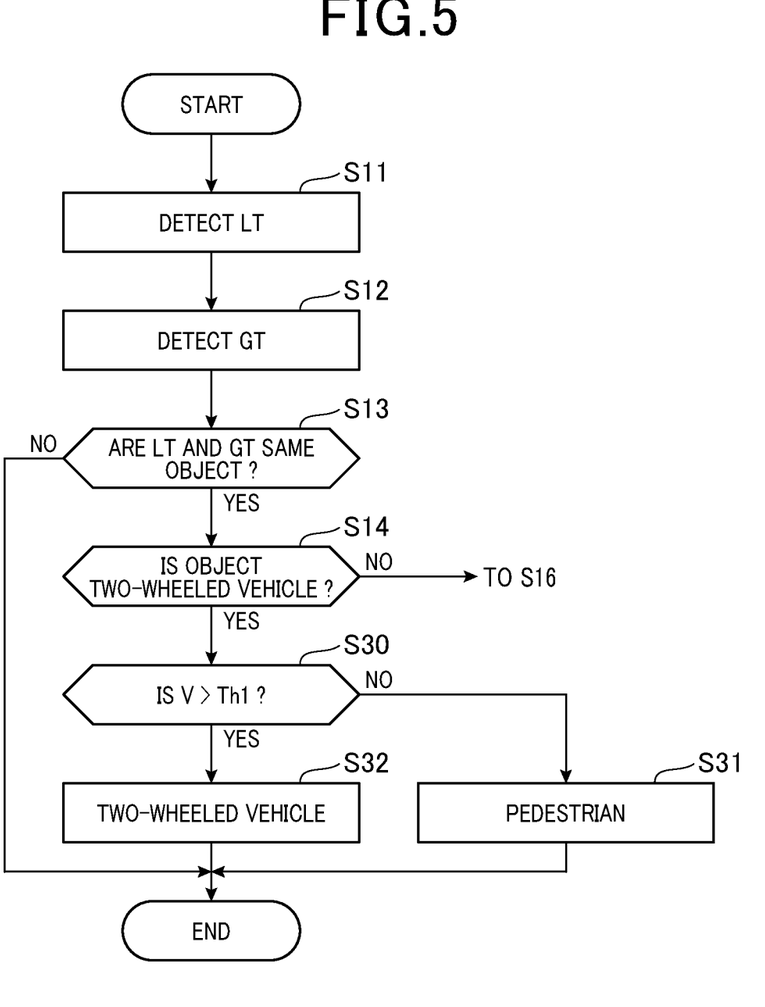
FIG. 5 is a flowchart of an object detection process according to a third embodiment.

In FIG. 5, when a temporary determination that the object is a two-wheeled vehicle is made at step S14, the object detection apparatus 10 proceeds to step S30 and determines whether or not the movement speed V of the object is greater than the first threshold Th1. When determined that the movement speed V of the object is greater than the first threshold Th1 at step S30, the object detection apparatus 10 determinates that the object is a two-wheeled vehicle (step S32). When determined that the movement speed V is less than the first threshold Th1 at step S30, the object detection apparatus 10 finally determines that the object is a pedestrian (step S31).

As described above, according to the third embodiment, a final determination that the object is a pedestrian is made when a temporary determination that the object is a two-wheeled vehicle is made and the movement speed is less than the first threshold Th1. Therefore, erroneous determination of the pedestrian as a two-wheeled vehicle can be prevented. In addition, a final determination that the object is a two-wheeled vehicle is made when a temporary determination that the object is a two-wheeled vehicle is made and the movement speed is greater than the first threshold Th1. Therefore, the determination accuracy when the object is a two-wheeled vehicle can be improved.

Other Embodiments

In the above-described processes, the order of the temporary determination regarding the type of the object and the determination process regarding the movement speed V of the object may be interchanged. For example, in the processes in FIG. 3, the process regarding whether or not the movement speed of the object is less than the first threshold Th1 is performed first at step S17. Then, when an affirmative determination is made at step S17, whether or not the temporary determination that the type of the object is a pedestrian at step S16 is determined. Then, when a temporary determination that the object is a pedestrian is made, the process proceeds to step S19 and a final determination that the object is a pedestrian is made.

In the above-described processes, the configuration may be that in which whether or not the temporary determination regarding the type of the object is successful is confirmed by the final determination. For example, when a temporary determination that the object is a pedestrian is made, only a determination regarding whether or not the temporary determination is correct, that is, whether the object is a pedestrian may be made based on the comparison with the movement speed V of the object. In a similar manner, when a temporary determination that the object is a motorcycle is made, only a determination regarding whether or not the temporary determination is correct, that is, whether the object is a motorcycle may be made based on the comparison with the movement speed V of the object.

Cases in which the movement speed V of the object is zero can also be assumed. When the movement speed V of the object is zero, the necessity of setting the operation time of each onboard apparatus to differing values based on the type of the object becomes low. Therefore, for example, when the radar target LT and the image target GT are determined to be the same object at step S13 shown in the flowchart in FIG. 3, whether or not the movement speed V of the object is zero may be determined. When the movement speed V of the object is determined to be zero, the processes from steps S13 to S19 may not be performed.

In the description above, an example in which the object detection apparatus 10 and the driving assistance apparatus are separate configurations is given. However, a configuration in which the driving assistance apparatus 30 includes the object detection apparatus 10 is also possible.

In the description above, when the radar target LT and the image target GT are determined to be the same object, a fused target FT may be generated by the radar target LT and the image target GT being integrated (fused). The positional information (such as distance and orientation) of the object may be identified through use of the fused target FT.

That is, the radar apparatus 22 has a higher detection accuracy regarding the distance to a target than the image sensor. Conversely, the onboard camera 21 has a higher detection accuracy regarding the lateral direction (such as lateral width and orientation) of a target than the radar apparatus 22. Taking advantage of this characteristic, the positional information of the target is acquired through use of both the onboard camera 21 and the radar apparatus 22. In addition, output from either of the sensors that can more accurately detect a detection item (such as distance or orientation) is used as a detection result for the detection item. As a result, the detection accuracy regarding the position of the object can be improved.

According to the above-described embodiments, in the object detection apparatus 10, a program is stored in the ROM that is a semiconductor memory corresponding to a non-transitory tangible recording medium. The functions of the object detection apparatus 10 are actualized as a result of the CPU that corresponds to a processor of a computer running the program. However, a configuration in which the program is stored in a non-transitory tangible recording medium other than the ROM (such as a non-volatile memory other than the ROM) and a processor such as the CPU runs the program is also possible. In this case, a configuration in which, as a result of the processor running the program stored in the non-transitory tangible recording medium such as the non-volatile memory, a method (such as an object detection method) corresponding to the program is performed in the object detection apparatus 10 is also possible.

In addition, some or all of the functions provided by the object detection apparatus 10 may be configured as hardware by a single or a plurality of integrated circuits (that is, ICs), or the like. Furthermore, the functions of the object detection apparatus 10 may be provided by software recorded in a non-transitory tangible recording medium, such as a non-volatile memory, and a computer that runs the software, by the software alone, by hardware alone, or by a combination thereof.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

The invention claimed is:

1. An object detection apparatus comprising:
    an object detecting unit that detects a pedestrian or a two-wheeled vehicle as an object that is present in a periphery of an own vehicle by performing image processing on a captured image capturing an advancing direction of the own vehicle;
    a temporary determination unit that temporarily determines whether a type of the object detected by the object detecting unit is a two-wheeled vehicle or a pedestrian by analyzing the captured image;
    a speed acquiring unit that acquires a movement speed of the object using reflected waves of a carrier wave; and
    a final determination unit that finally determines that the type of the object temporarily determined by the temporary determining unit is a two-wheeled vehicle or a pedestrian using the movement speed of the object acquired by the speed acquiring unit, wherein
    the final determination unit determines that the object is a two-wheeled vehicle including an occupant when the temporary determination unit determines that the object is a pedestrian and the movement speed is greater than a predetermined first threshold.

2. The object detection apparatus according to claim 1, wherein:
    the final determination unit determines that the object is a pedestrian when the temporary determination unit determines that the object is a pedestrian and the movement speed is less than a predetermined second threshold.

3. The object detection apparatus according to claim 1, wherein:
    the final determination unit determines that the object is a two-wheeled vehicle including an occupant when the temporary determination unit determines that the object is a two-wheeled vehicle and the movement speed is greater than a predetermined first threshold.

4. The object detection apparatus according to claim 3, wherein:
    the final determination unit determines that the object is a pedestrian when the temporary determination unit determines that the object is a two-wheeled vehicle and the movement speed is less than a predetermined first threshold.

5. The object detection apparatus according to claim 3, wherein:
    the final determination unit determines that the object is a bicycle including an occupant when the movement speed is less than a third threshold that is greater than the predetermined first threshold, and determines that the object is a motorcycle including an occupant when the movement speed is greater than the third threshold.

6. The object detection apparatus according to claim 1, wherein:
    the final determination unit determines that the object is a bicycle including an occupant when the movement speed is less than a third threshold that is greater than the predetermined first threshold, and determines that the object is a motorcycle including an occupant when the movement speed is greater than the third threshold.

7. The object detection apparatus according to claim 1, wherein:
    the final determination unit determines that the object is a pedestrian when the temporary determination unit determines that the object is a pedestrian and the movement speed is less than a predetermined second threshold.

8. An object detection apparatus comprising:
    an object detecting unit that detects a pedestrian or a two-wheeled vehicle as an object that is present in a periphery of an own vehicle by performing image processing on a captured image capturing an advancing direction of the own vehicle,
    a temporary determination unit that temporarily determines whether a type of the object detected by the object detecting unit is a two-wheeled vehicle or a pedestrian by analyzing the captured image;
    a speed acquiring unit that acquires a movement speed of the object using reflected waves of a carrier wave; and
    a final determination unit that finally determines that the type of the object temporarily determined by the temporary determining unit is a two-wheeled vehicle or a pedestrian using the movement speed of the object acquired by the speed acquiring unit, where
    the final determination unit determines that the object is a pedestrian when the temporary determination unit determines that the object is a two-wheeled vehicle and the movement speed is less than a predetermined first threshold.

9. An object detection method comprising:
    detecting, by an object detection apparatus that is mounted in an own vehicle, a pedestrian or a two-wheeled vehicle as an object that is present in a periphery of an own vehicle by performing image processing on a captured image capturing an advancing direction of the own vehicle;

temporarily determining, by the object detection apparatus, whether a type of the object detected is a two-wheeled vehicle or a pedestrian by analyzing the captured image;

acquiring, by the object detection apparatus, a movement speed of the object using reflected waves of a carrier wave; and finally determining, by the object detection apparatus, that the type of the object is a two-wheeled vehicle or a pedestrian using the movement speed of the object that is acquired, wherein the finally determining step comprises:
   finally determining, by the object detection apparatus, that the object is a two-wheeled vehicle including an occupant when it temporarily determined that the object is a pedestrian and the movement speed is greater than a predetermined first threshold.

10. An object detection apparatus comprising:
an object detecting unit that detects a pedestrian or a two-wheeled vehicle as an object that is present in a periphery of an own vehicle by performing image processing on a captured image capturing an advancing direction of the own vehicle;

a temporary determination unit that temporarily determines a type of the object detected by the object detecting unit by analyzing the captured image;

a speed acquiring unit that acquires a movement speed of the object using reflected waves of a carrier wave; and a final determination unit that finally determines the type of the object temporarily determined by the temporary determining unit using the movement speed of the object acquired by the speed acquiring unit, wherein:

the final determination unit determines that the object is a two-wheeled vehicle including an occupant when the temporary determination unit determines that the object is a pedestrian and the movement speed is greater than a predetermined first threshold.

11. The object detection apparatus according to claim 10, wherein:
the final determination unit determines that the object is a pedestrian when the temporary determination unit determines that the object is a pedestrian and the movement speed is less than a predetermined second threshold.

12. The object detection apparatus according to claim 10, wherein:
the final determination unit determines that the object is a bicycle including an occupant when the movement speed is less than a third threshold that is greater than the predetermined first threshold, and determines that the object is a motorcycle including an occupant when the movement speed is greater than the third threshold.

\* \* \* \* \*